(12) United States Patent
Takeuchi et al.

(10) Patent No.: US 6,254,844 B1
(45) Date of Patent: Jul. 3, 2001

(54) METHOD FOR PRODUCTION OF SINTERED LITHIUM TITANIUMPHOSPHATE AND SINTERED PELLETS OBTAINED BY THE METHOD

(75) Inventors: Tomonari Takeuchi; Kazuaki Ado; Mitsuharu Tabuchi; Hiroyuki Kageyama, all of Osaka (JP)

(73) Assignee: Agency of Industrial Science & Technology, Ministry of International Trade & Industry, Tokyo (JP)

( * ) Notice: Subject to any disclaimer, the term of this patent is extended or adjusted under 35 U.S.C. 154(b) by 0 days.

(21) Appl. No.: 09/409,073

(22) Filed: Sep. 30, 1999

(30) Foreign Application Priority Data

Oct. 2, 1998 (JP) .................................. 10-296013

(51) Int. Cl.[7] .............................. C01B 25/45; H05R 3/04
(52) U.S. Cl. ................. 423/306; 204/164; 423/DIG. 10; 429/30; 429/322
(58) Field of Search ........................... 423/306, DIG. 10; 204/157.45, 908, 164; 419/45, 52, 56; 429/322, 30

(56) References Cited

U.S. PATENT DOCUMENTS 4,985,317 * 1/1991 Adashi .................................. 429/191

FOREIGN PATENT DOCUMENTS

09049036 * 2/1997 (JP) .

OTHER PUBLICATIONS

Kobayashi et al, "Densification of LiTi2(PO4)3—based solid electrolytes by spark–plasma–sintering" Journal of power Sources 81–82 (1999). pp. 853–858.*

* cited by examiner

Primary Examiner—Wayne Langel
Assistant Examiner—Maribel Medina
(74) Attorney, Agent, or Firm—Oblon, Spivak, McClelland, Maier & Neustadt, P.C.

(57) ABSTRACT

A sintered lithium titaniumphosphate is produced by subjecting the powder of a mixture consisting of a Li source, a Ti source, and a P source to spark plasma sintering under an increased pressure.

12 Claims, 2 Drawing Sheets

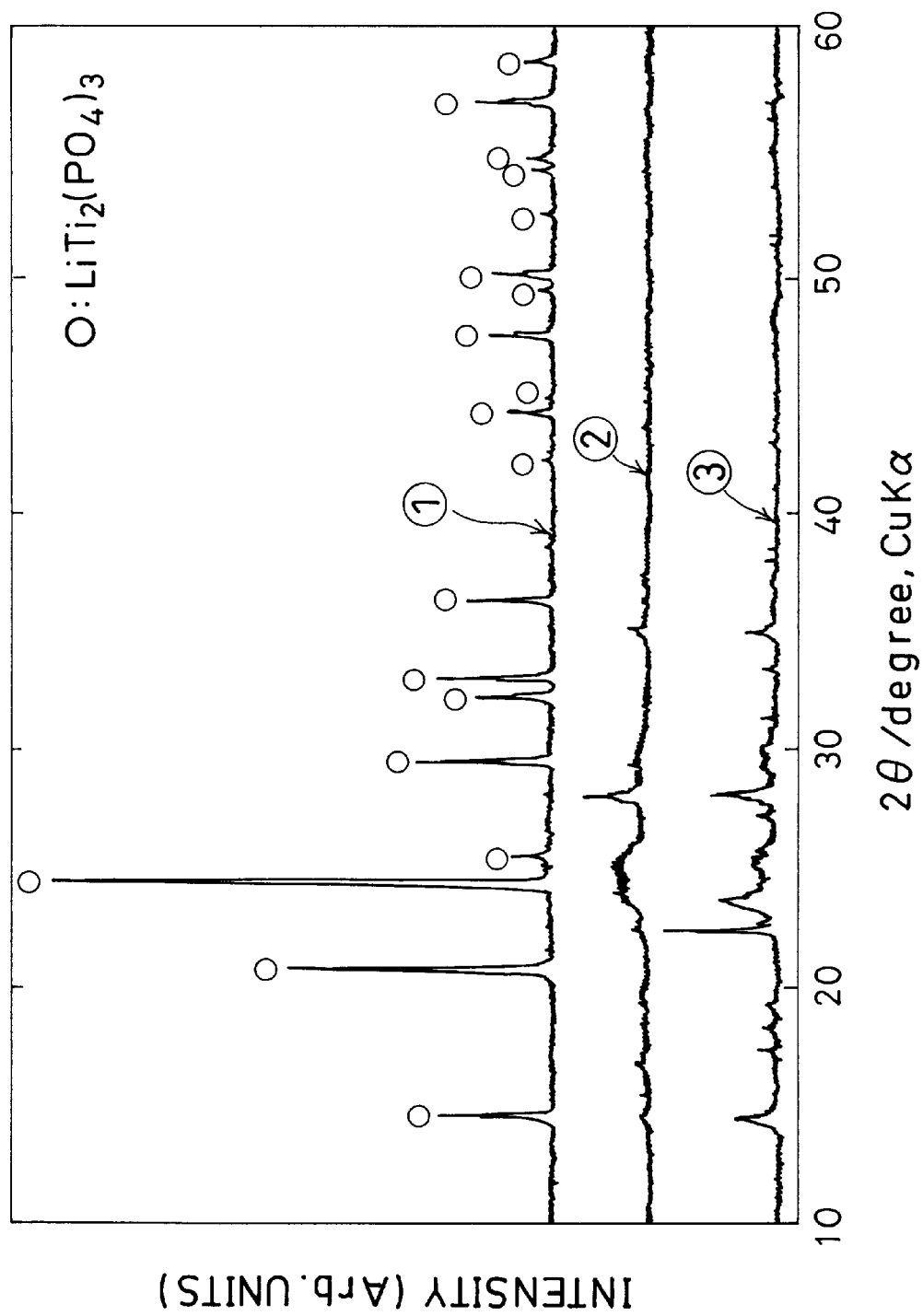

METHOD FOR PRODUCTION OF SINTERED LITHIUM TITANIUMPHOSPHATE AND SINTERED PELLETS OBTAINED BY THE METHOD

BACKGROUND OF THE INVENTION

1. Field of the Invention

This invention relates to a method for the production of a sintered lithium titaniumphosphate which is usable as a highly lithium ion conductive inorganic solid electrolyte and a sintered pellet obtained by this method. Such an electrolyte is particularly useful as an inorganic solid electrolyte for cells such as lithium ion cells.

2. Description of the Prior Art

The lithium ion cells currently used in such portable electronic devices as portable telephones are advantageous over other sorts of cells in terms of energy density. Lithium ion cells are therefore being developed for power storage and for use as the power source for electric cars. Organic electrolytic solutions are used as electrolytes in the cells of rechargeable lithium ion batteries now available on the market. They have such problems so possible leakage and corrosion and also of being combustible.

Among the lithium ion conductive materials which are prospective alternative substances for the organic electrolytic solutions is counted lithium titaniumphosphate [$LiTi_2(PO_4)_3$], which is an inorganic solid electrolyte. This is a chemically and electrochemically safe material as compared with organic electrolytic solutions and is thought to be a promising material for practical use. However, the inorganic electrolytes have a disadvantage in that it must be formed into a sintered pellet, necessitating a multistage, time-consuming process which comprises mixing raw material powders, firing the resultant mixture, further molding the fired mixture in the shape of tablets, and sintering the produced tablets. In addition, the firing treatment has to be conducted at a high temperature in the approximate range of 1000–1200° C. (H. Aono, E. Sugimoto, Y. Sadaoka, N. Imanaka, and G. Adachi; J. Electrochem. Soc., 137 (1990), 1023; referred to hereinafter as "cited reference 1"). A method which is capable of easily manufacturing the electrolyte by a quick one-stage process at a low temperature has therefore been desired.

In light of the foregoing circumstances, this invention is directed to providing a novel method that permits easy production of a sintered lithium titaniumphosphate as a highly lithium ion conductive inorganic solid electrolyte and a sintered pellet obtained by the method.

SUMMARY OF THE INVENTION

Upon conducting a study with a view to eliminating the disadvantages of the prior art mentioned above, the present inventors discovered that the sintered lithium titaniumphosphate [$LiTi_2(PO_4)_3$] can be acquired quickly by a one-stage process at a low temperature by applying a DC pulse current to the powder of a mixture of an Li source, a Ti source, and a P source under an increased pressure. They perfected the present invention based on this knowledge.

Specifically, this invention relates to a method for the production of a sintered lithium titaniumphosphate [$LiTi_2(PO_4)_3$] characterized by applying a DC pulse current to the powder of a mixture of an Li source, a Ti source, and a P source under an increased pressure and to the sintered pellet produced by the method.

BRIEF DESCRIPTION OF THE DRAWINGS

FIG. 2 is a graph showing the X-ray diffraction patterns respectively of (1) a sample of the lithium titaniumphosphate [$LiTi_2(PO_4)_3$] sintered by this invention (3) a sample of the powder of a mixture of starting raw materials, and (2) a sample obtained by subjecting the powder of the mixture to the conventional sintering method.

DESCRIPTION OF THE PREFERRED EMBODIMENTS

Figure 1:
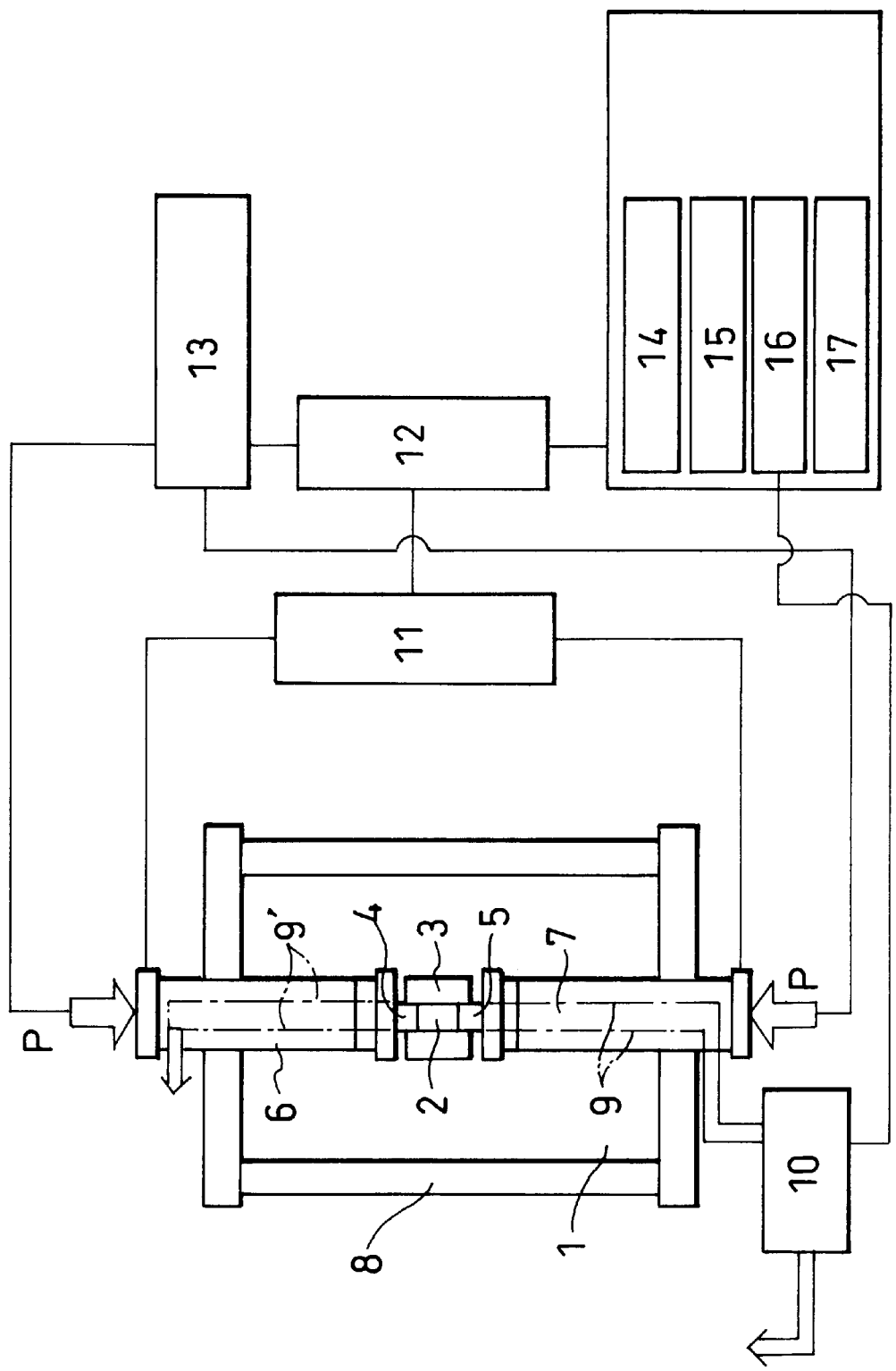
FIG. 1 is a schematic diagram illustrating one example of a spark plasma sintering machine which can be applied to the method for the production contemplated by this invention.

The method of production according to this invention allows easy manufacture of the target substance, namely the sintered lithium titaniumphosphate [$LiTi_2(PO_4)_3$] as a highly lithium ion conductive inorganic solid electrolyte, by preparing the powder of the mixture mentioned above and subjecting this powder to the spark plasma sintering process which consists in applying a DC pulse current under an increased pressure.

As the starting material is used a mixed powder composed of an Li source, a Ti source, and a P source. As the Li source, any of various Li-containing inorganic compounds can be used. As specific examples, $LiOH$, $LiOH \cdot H_2O$, $Li_2CO_3$, $LiNO_3$ etc. can be cited. As the Ti source, any of various Ti-containing inorganic compounds can be used. As specific examples, $H_2TiO_3$, $TiO_2$, $Ti(SO_4)_2$ etc. can be cited. As the P source, any of various P-containing inorganic compound can be used. As specific examples, $H_3PO_4$, $LiPO_4$, $H_3PO_2$ etc. can be cited.

The mixing ratio of the raw materials for the powder, namely the ratio (molar ratio) of Li source:Ti source:P source, is preferred generally to fall in the approximate range of 5–20:10–30:25–45. This mixing ratio (molar ratio) of Li source:Ti source:P source more preferably falls in the approximate range of 12–18:17–23:33–40.

When the mixing ratio falls outside the range specified above, the produced sintered pellet suffers the following drawback.

The target $LiTi_2(PO_4)_3$ is not obtained in a single phase because it inevitably entrains such impurities as $TiP_2O_7$ and $HLiTi(PO_4)_2$.

The method of producing the powder of the mixed raw materials, is not particularly limited. The powder can be attained advantageously, for example, by mixing and stirring the powders of the component sources mentioned above in an aqueous solvent. No particular limit is imposed on the particle diameter of the mixed powder.

Though the conditions adopted in subjecting the mixed powder of raw materials to the spark plasma sintering are not particularly limited, the sintering can be carried out under the following conditions, for example.

Specifically, according to the method of this invention, by applying a DC pulse current in, for example, the approximate range of 200–500 A, preferably 300–350 A, to the mixed powder of starting raw materials under an increased pressure in, for example, the approximate range of 5–40 MPa, preferably 10–30 MPa, the $LiTi_2(PO_4)_3$ can be synthesized through a solid-state reaction and, at the same time, the sintering of this compound can be manufactured in a one-stage process at a low temperature in, for example, the approximate range of 250–1000° C., preferably 300–500° C., and more preferably 330–340° C. in a brief span of time usually falling in the approximate range of 2–10 minutes, preferably 3–5 minutes.

In a preferred embodiment of the method of this invention, the synthesis and the sintering of the $LiTi_2(PO_4)_3$ are carried out using a spark plasma sintering machine. The synthesis, compression, and sintering aimed at by this invention can be accomplished in accordance with the sintering method utilizing the ON-OFF pulse electrization for spark plasma sintering, by feeding a pulse of current to a mass formed by compressing the powder, controlling the peak and the pulse width of the current, and further controlling the temperature of the material under treatment. The spark which occurs in the gaps between the particles of powder, the actions of the spark plasma and the spark impact pressure in cleaning and activating the particle surface, the effect of electrolytic diffusion which occurs in the electric field, the effect of thermal diffusion due to the Joule heat, and the force of plastic deformation due to the application of pressure jointly form a driving force for synthesis and sintering and promote the manufacture of the sintering of the target substance.

The spark plasma sintering machine which can be used effectively in this invention is only required to be capable of heating, cooling and pressing the mixed powder of raw materials, and applying to the mixed powder an electric current sufficient enough to induce spark. To be specific, the raw material powder can be synthesized and sintered by the use of a spark plasma sintering machine which is provided with a heating/cooling device, a pressing device, a discharge device, and a jig for accommodating the raw material powder. Graphite is suitable as the material for the jig.

FIG. 1 schematically illustrates the structure of one example of the spark plasma sintering machine. A spark plasma sintering device (1) is provided with a molding grade sintering die (3) to be packed with a powder (2) and a vertical pair of compressing and electrifying punches (4, 5). To the punches (4, 5), a pulse current is fed by a vertical pair of electrifying and compressing punch electrodes (6, 7) which are formed with internal cooling water conduits (9, 9') and are adapted to be driven by a compressing mechanism (13).

The molding die (3) and the punches (4, 5) are formed of electroconductive materials so as to be capable of feeding the pulse current to the powder (2). The punches (4, 5) are connected to a sintering power source (11) through the medium of a power feed terminal (not shown) which is disposed in the compressing punch electrodes (6, 7). The sintering power source (11) is connected so that the pulse current generated thereby flows to the powder (2) via the molding die (3) and the punches (4, 5). The electrizing part is accommodated in a water-cooled chamber (8). The interior of this chamber can be maintained at a prescribed degree of vacuum by an atmosphere control mechanism (15) or can be filled with an atmosphere of an inert gas such as argon or an atmosphere of air.

The molding die (3) and the punches (4, 5) can be formed in shapes to conform to the shape of a sintered pellet to be produced. The molding die and the punches, as depicted herein, are formed in cylindrical shapes. This embodiment therefore produces sintered bodies in the form of cylindrical pellets. Though the molding die (3) and the punches (4, 5), as contemplated herein, are formed of a graphite possessing electric conductivity, they may be formed of other materials such as, for example, an electrically conductive ceramic substance on the condition that the material exhibits electric conductivity and heat resistance and possesses enough strength to withstand the applied pressure.

The control device (12) illustrated in FIG. 1 is for controlling the operation of the compressing mechanism (13), the sintering power source (11), a position measuring mechanism (14), the atmosphere control mechanism (15), water-cooled mechanisms (10, 16), and a temperature measuring device (17). The control device (12) is configured to drive the compressing mechanism (13) and cause the punches (4, 5) to compress the powder (2) with a prescribed compressing pressure. The temperature of the powder (2) in a compressed state is detected as with a thermoelectric couple or a radiant thermometer (not shown) attached to the molding die (3). The value so detected is sent into the control device (12) and utilized therein to drive the sintering power source (11) based on a prescribed control program and give rise to a pulse current.

The frequency of the pulse current may be set in the range of 10 Hz to 30 kHz, for example. From the aspect of the cost of the power source, it is advisable to use a low frequency. The heating temperature is suitably adjusted within the range mentioned above in due consideration of such factors as the kind of raw material powder. The control device (12) is configured to adjust the magnitudes of current and voltage and ensure coincidence between the detected magnitude of the temperature of the compressed powder (2) and the preset curve of temperature elevation.

The electrizing sintering method using a spark plasma sintering machine based on the pulse electrizing process of the nature described above possesses a high thermal efficiency as compared with the conventional sintering method using induction heating or radiant heating because it makes direct use of the Joule heat which induces self-heating of the compressed powder. This method further causes spark in the gaps between particles of powder owing to the application of a pulse of voltage/current, promotes a solid-state reaction owing to the local elevation of temperature accompanying the spark, and permits manufacture of a dense mass owing to the formation of necks between particles and the advance of sintering as well. By the sintering operation using an ordinary electric oven, therefore, this method can quickly manufacture a prescribed sintered pellet at a low temperature.

When graphite is used as the material for the jig in the present method, for example, the region near the surface of the sintered pellet comes to contain the graphite of which the jig is formed. Extraneous matter such as graphite contained near the surface of the sintered pellet can be removed as by polishing the surface of the sintered pellet, annealing the surface in the ambient air, etc.

The invention will now be described more specifically with reference to working examples of the manufacture of sintered lithium titaniumphosphate.

EXAMPLE 1

(1) Preparation of Powdered Mixture of Raw Materials

Though the preparation of the mixture of powdered starting raw materials used in the synthesis sintering of lithium titaniumphosphate with a spark plasma sintering machine is not particularly limited as regards kind of raw materials and conditions of relevant operations, the powder was prepared as follows. First, 100 ml of an aqueous 0.45 M LiOH solution was mixed with 100 ml of an aqueous 1.08 M $H_3PO_4$ solution and the resultant mixture was thoroughly stirred with a solution having 0.06 mol of thoroughly pulverized $H_2TiO_3$ dispersed in 100 ml of distilled water. The reaction solution consequently formed was dried overnight at 100° C. to remove the aqueous solvent and obtain a mixed powder of the starting raw materials, i.e. LiOH, $T_2TiO_3$, and $H_3PO_4$.

(2) Synthesis and Sintering of $LiTi_2(PO_4)_3$ by Spark Plasma Sintering Process An SPS-515S spark plasma sintering machine manufactured by Sumitomo Coal Mining Co., Ltd. was used. The jig was made of graphite in a cylindrical shape 1.5 cm in diameter. In this jig, about 1 g of the raw material powder prepared by the procedure mentioned above was placed uniformly and compressed under a pressure of about 20 MPa. Further, by applying a DC pulse current of about 300 A to the jig, the sample was heated to 330° C. at a temperature increasing rate of about 110° C./min. After the sample had been retained in the ensuing state for three minutes, the feed of current and the application of pressure were stopped and the sample was left to cool to normal room temperature.

The sintered pellet finally extracted from the machine was black in color. This sintered pellet, after having the surface polished, acquired the same white color as the raw material powder. The sintered pellet was found to be formed solely of $LiTi_2(PO_4)_3$ as shown by the X-ray diffraction pattern (1) in FIG. 2. The lattice constants were a=8.5204 (4) (which denotes 8.5204±0.0004; the same notation being used hereinafter) Å and c=20.861 (2) Å, which are close to the reported values of a sample prepared by the ordinary solid-state reaction method (a=8.512 Å and c=20.858 Å) (Cited Reference 1). The density of the sintered pellet was 2.2 g/cm$^3$ (74% of the theoretical density). This is higher than the density of 1.9 g/cm$^3$ (66% of the theoretical density) of the sintered pellet obtained by the ordinary solid-state reaction method (Cited Reference 1). This fact means that by the spark plasma sintering method, the target $LiTi_2(PO_4)_3$ ceramics could be obtained by a one-stage process from the starting raw materials quickly at a low temperature.

For comparison, the X-ray diffraction pattern (2) of a sample of an ordinary sintered pellet obtained by heat-treating the same powdered mixture of raw materials with an electric oven at 330° C. for three minutes is also shown in FIG. 2. The pattern clearly shows that this sample, in contrast with the sample in accordance with the spark plasma sintering method, failed to synthesize $LiTi_2(PO_4)_3$ and kept the raw materials in substantially an undecomposed state. The X-ray diffraction pattern (3) of the raw materials is also shown in FIG. 2. No matter how the temperature and the time were changed, the ordinary sintering method could not synthesize the single phase of $LiTi_2(PO_4)_3$ at all below 1200° C.

The method of production according to this invention has the conspicuous effect of enabling the sintered pellet of lithium titaniumphosphate [$LiTi_2(PO_4)_3$] to be obtained easily and stably in a one-stage process quickly at a low temperature. The sintered lithium titaniumphosphate thus obtained is highly lithium ion conductive and can be used particularly advantageously as an inorganic solid electrolyte for a lithium ion cell.

The method of production contemplated by this invention can be applied to various lithium ion conductive inorganic solid electrolytes other than $LiTi_2(PO_4)_3$ such as, for example, LiI, $Li_3N$, $LiZr_2(PO_4)_3$, and $Li_4SiO_4$, and solid solutions resulting from various combinations thereof. It is capable of obtaining a target sintered pellet quickly at a low temperature as compared with the conventional sintering method by external heating.

We claim:

1. A method for the production of a sintered lithium titaniumphosphate having the formula $LiTi_2(PO)_3$, comprising subjecting a powder of a mixture consisting of a Li source, a Ti source, and a P source to spark plasma sintering under an increased pressure; and recovering the sintered lithium titaniumphosphate.

2. A method according to claim 1, wherein said Li source is at least one member selected from the group consisting of LiOH, LiOH.H$_2$P, Li$_2$CO$_3$, and LiNO$_3$.

3. A method according to claim 1, wherein said Ti source is at least one member selected from the group consisting of H$_2$TiO$_3$, TiO$_2$, and Ti(SO$_4$)$_2$.

4. A method according to claim 1, wherein said P source is at least one member selected from the group consisting of H$_3$PO$_4$, Li$_3$PO$_4$, and H$_3$PO$_2$.

5. A method according to claim 1, wherein said Li source is LiOH, said Ti source is H$_2$TiO$_3$, and said P source is H$_3$PO$_4$.

6. A method according to claim 1, wherein the mixing ratio of the powders of said Li source, said Ti source, and said P source is in the range of 5–20:10–30:25–45 by molar ratio.

7. A method according to claim 6, wherein the mixing ratio of the powders of said Li source, said Ti source, and said P source is in the range of 12–18:17–23:33–40 by molar ratio.

8. A method according to claim 1, wherein the pressure applied to the powder of the mixture is in the range of 5–40 MPa.

9. A method according to claim 8, wherein the pressure applied is in the range of 10–30 MPa.

10. A method according to claim 1, wherein said spark plasma sintering of said powder mixture under an increased pressure is accomplished by performing both the synthesis of solid-state reaction and the sintering in a one-stage process by application of a DC pulse current.

11. A method according to claim 10, wherein said DC pulse current is 200–500 A in magnitude and is applied at a temperature in the range of 250–1000° C. for a period in the range of 2–10 minutes.

12. A method according to claim 11, wherein said DC pulse current is 300–350 A in magnitude and is applied at a temperature in the range of 300–500° C. for a period in the range of 3–5 minutes.

* * * * *